E. B. PAUL.
FARE REGISTER.
APPLICATION FILED NOV. 1, 1915.

1,286,758.

Patented Dec. 3, 1918.
7 SHEETS—SHEET 1.

INVENTOR
Edward B. Paul
BY
ATTORNEYS

E. B. PAUL.
FARE REGISTER.
APPLICATION FILED NOV. 1, 1915.

1,286,758.

Patented Dec. 3, 1918.
7 SHEETS—SHEET 2.

Fig. 3.

INVENTOR
Edward B. Paul
BY
Pennie, Davis & Marvin
ATTORNEYS

E. B. PAUL.
FARE REGISTER.
APPLICATION FILED NOV. 1, 1915.

1,286,758.

Patented Dec. 3, 1918.
7 SHEETS—SHEET 3.

INVENTOR
Edward B. Paul
BY
Pennie Davis Marvin
ATTORNEYS

E. B. PAUL.
FARE REGISTER.
APPLICATION FILED NOV. 1, 1915.

1,286,758.

Patented Dec. 3, 1918.
7 SHEETS—SHEET 4.

INVENTOR
Edward B. Paul
BY
Fennis Davis & Marr
ATTORNEYS

E. B. PAUL.
FARE REGISTER.
APPLICATION FILED NOV. 1, 1915.

1,286,758.

Patented Dec. 3, 1918.
7 SHEETS—SHEET 5.

INVENTOR
Edward B. Paul
BY
Pennie, Davis & Marvin
ATTORNEYS

E. B. PAUL.
FARE REGISTER.
APPLICATION FILED NOV. 1, 1915.

1,286,758.

Patented Dec. 3, 1918.
7 SHEETS—SHEET 7.

INVENTOR
Edward B Paul
BY
ATTORNEY

UNITED STATES PATENT OFFICE.

EDWARD B. PAUL, OF WINTHROP, MASSACHUSETTS.

FARE-REGISTER.

1,286,758.   Specification of Letters Patent.   Patented Dec. 3, 1918.

Application filed November 1, 1915. Serial No. 58,997.

*To all whom it may concern:*

Be it known that I, EDWARD B. PAUL, a citizen of the United States, residing at and whose post-office address is No. 36 Summit avenue, Winthrop, county of Suffolk, State of Massachusetts, have invented certain new and useful Improvements in Fare-Registers; and I do hereby declare the following to be a full, clear, and exact description of the invention, such as will enable others skilled in the art to which it appertains to make and use the same.

This invention relates to fare registers, such as are used on passenger cars, and more particularly to that type of register which is adapted to receive coins of various denominations and which is provided with a counting device associated with actuating means therefor for registering thereon the coins received in terms of coins of one of the denominations for which the fare register is adapted.

More specifically the fare register is adapted for the reception of nickels, pennies and dimes, and means are provided whereby each nickel and each group of five pennies that pass through the register will cause the counting device to register one fare, while each dime that passes therethrough will cause the counting device to register two fares.

The apparatus includes a coin-box into which the coins are dropped haphazard by the passengers or the conductor, a hopper into which the accumulated coins are discharged periodically from the coin-box and so shaped that the coins will stack therein one on top of the other; means for successively ejecting the coins from the bottom of the stack through an orifice just big enough to permit the passage of a nickel, thus preventing the passage of a larger coin or check or a badly bent coin or check, an assorting mechanism into which the ejected coins pass and wherein they are positioned according to their denominations, and coin-controlled counter-actuating devices corresponding to the several denominations and acting upon a common counter to count the coins in terms of a single denomination. In the specific example selected for illustration, the nickels, dimes and pennies are registered in terms of nickels. The machine is preferably further provided with means controllable by the conductor to empty the hopper in case there is deposited therein a coin or check which will not pass through the above mentioned orifice.

To briefly summarize the operation of the device, the coins which are deposited in the coin-box are periodically emptied therefrom into the receptacle from which they are ejected one at a time into a runway in which they are positioned according to their denomination. Associated with the runway are coin-controlled locking devices for normally locking the counting-device-actuating-means in inoperative position. When a coin is received in the runway it renders its corresponding locking device inoperative whereupon the counting-device-actuating-means associated therewith is released and actuates the counting device in accordance with the denomination of the coin. At the same time the coin is allowed to escape from the runway and is delivered into a collecting receptacle.

In the accompanying drawings showing an illustrative embodiment of the invention—

Figure 6:
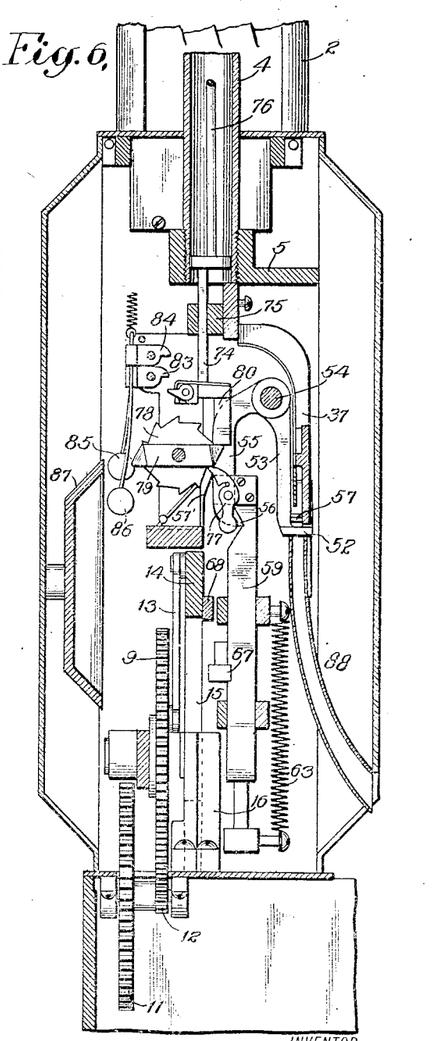
Fig. 6 is a sectional view taken on the line 6—6 of Fig. 3.

Referring to the drawings, 1 represents a casing of any suitable form and construction within which the operating mechanism is inclosed and which is provided at its upper end with a coin-box 2 for the reception of coins. 3 represents a fare counting device of any suitable type which is mounted upon one end of a tubular support 4, the other end of which passes through an opening formed in the top of the casing 1 and is supported by a bracket 5 (Fig. 6).

Pivotally supported within the casing 1 and forming a movable bottom for the box 2 are a pair of vertically swinging doors 6 and 7 (see Fig. 7), the opening and closing movements of which are controlled by the mechanism now to be described.

Figure 1:
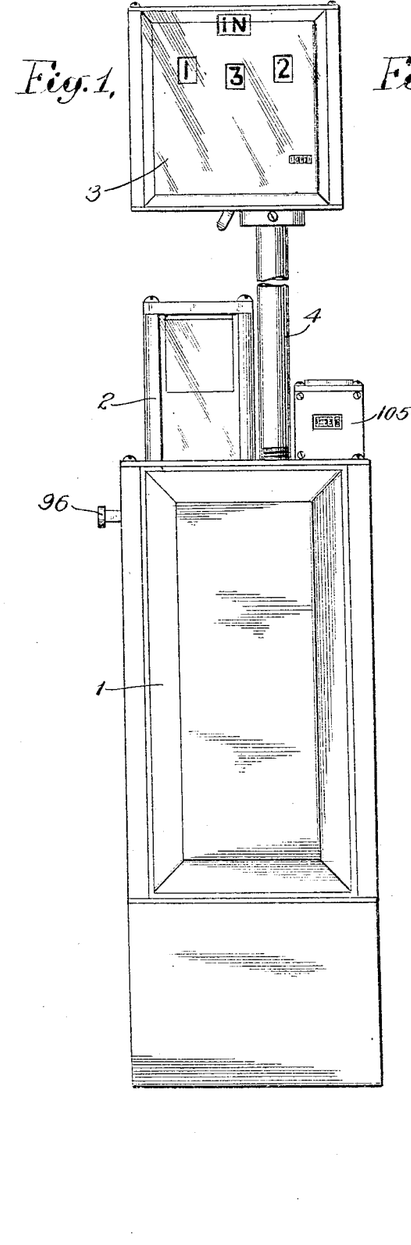
Figure 1 shows the fare register in front elevation.
Figure 2:
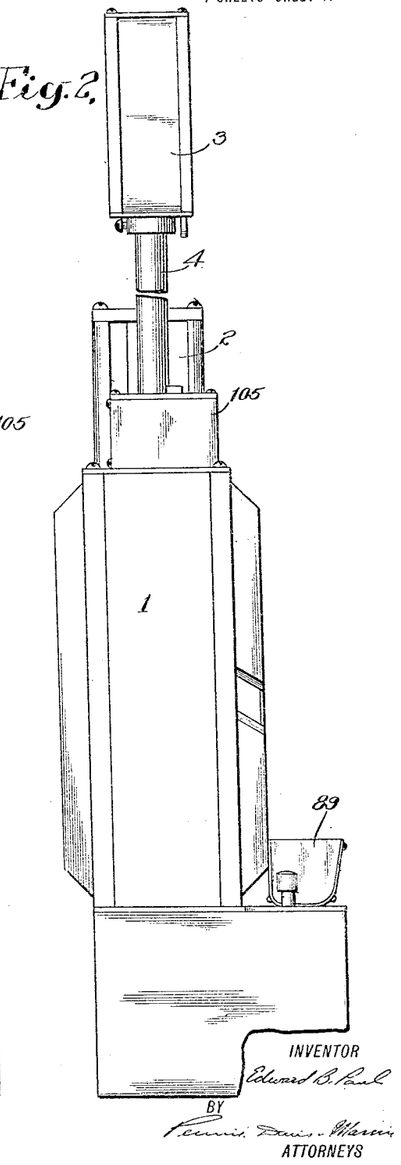
Fig. 2 is a side elevational view thereof.
Figure 3:
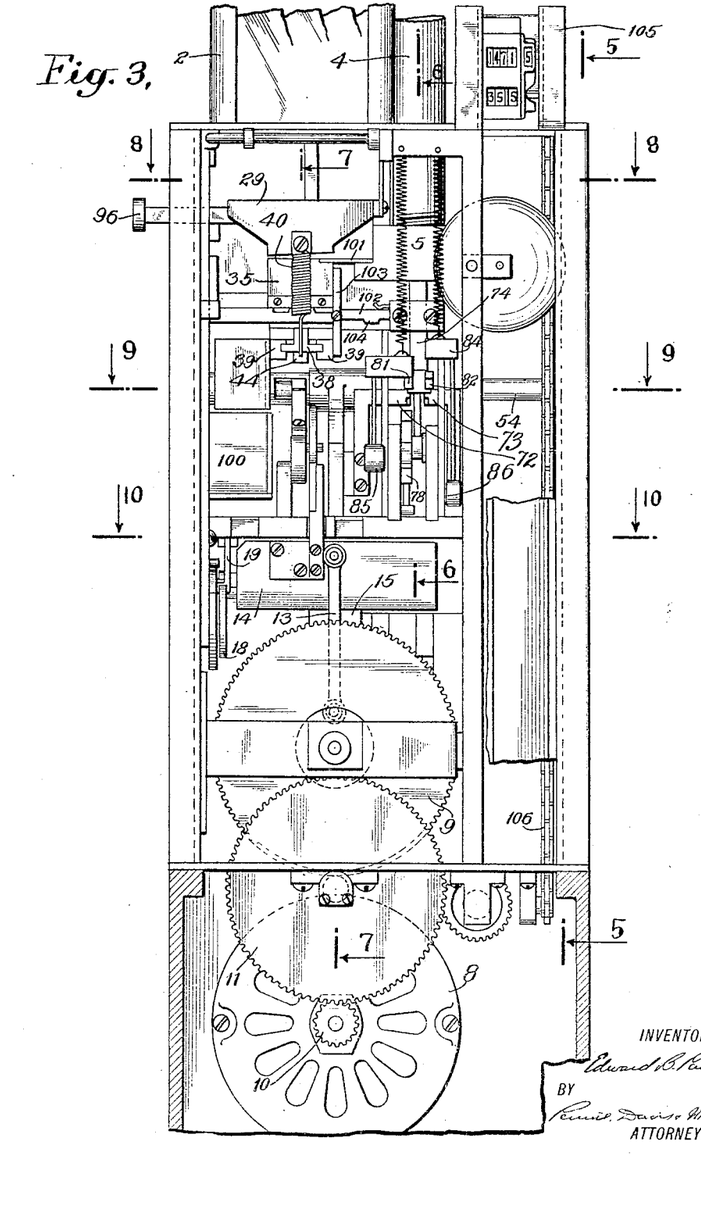
Fig. 3 is a front elevational view, the wall of the casing being removed.
Figure 7:
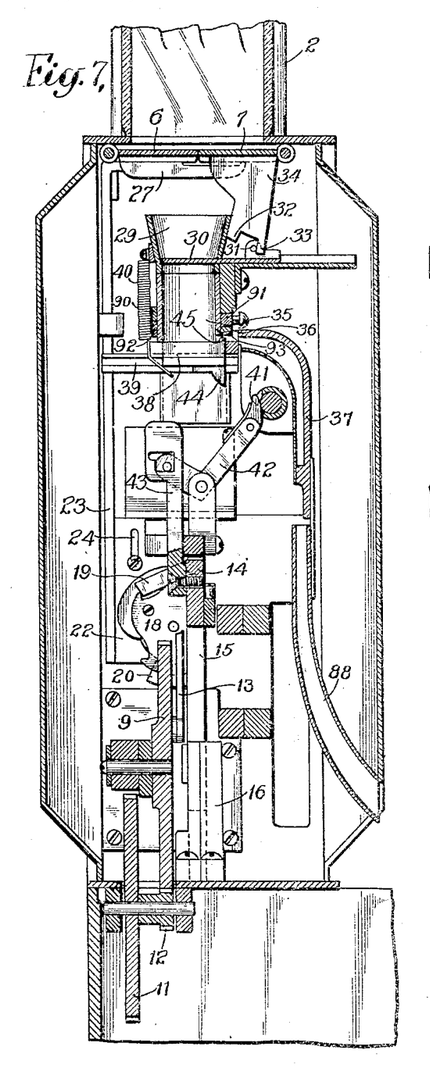
Fig. 7 is a sectional view taken on the line 7—7 of Fig. 3.
Figure 8:
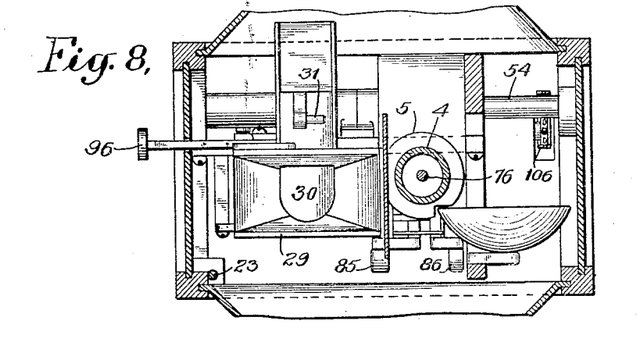
Fig. 8 is a sectional view taken on the line 8—8 of Fig. 3.
Figure 9:
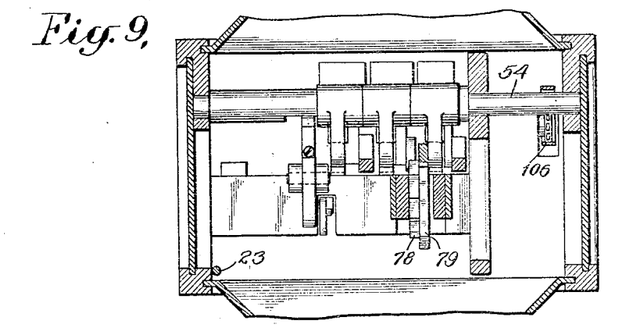
Fig. 9 is a sectional view taken on the line 9—9 of Fig. 3.
Figure 10:
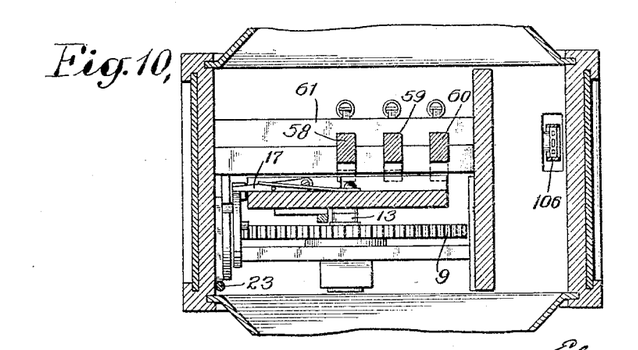
Fig. 10 is a sectional view taken on the line 10—10 of Fig. 3.
Figure 12:
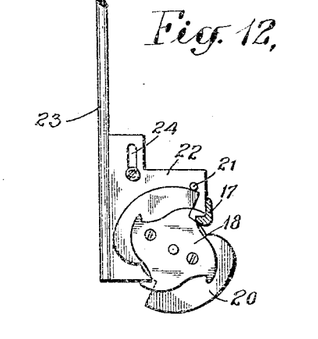
Fig. 12 is a detail view of a portion of the means for controlling the opening and closing of the doors at the bottom of the coin-box.
Figure 17:
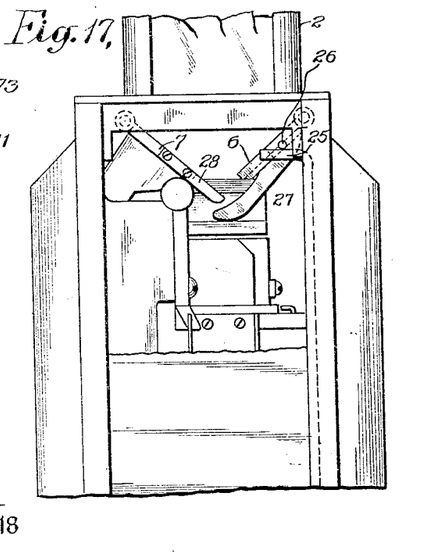
Fig. 17 is a detail elevational view showing the coin-box doors in their open position.

Mounted within the lower part of the casing 1 is a motor 8 (Fig. 3) which is connected to a gear wheel 9 by a train of gearing 10, 11 and 12. A pitman 13 has one of its ends connected to the gear wheel 9 and its other end connected to a vertically reciprocatable actuating member comprising a transversely extending portion 14 and a downwardly extending portion 15 which is slidingly supported in a bracket 16. The actuating member carries a pawl 17 (see Figs. 10 and 12) adapted to engage the teeth of a ratchet wheel 18 which is rotatably mounted within the casing 1, the parts being so arranged that the ratchet wheel will be rotated one step upon each upward movement of the actuating member. Rotation of the ratchet wheel in the opposite direction is prevented by a dog 19 (Figs. 3 and 7) pivotally mounted within the casing. Secured to the ratchet wheel and rotatable therewith is a cam 20 having two similar cam surfaces which are adapted to engage a pin 21 carried by a lateral extension 22 secured to the lower end of a rod 23. This lateral extension is connected to the casing by a pin and slot connection 24 whereby an up and down movement thereof is permitted. At its upper end the rod 23 is provided with an offset portion 25 (Fig. 17) which engages a pin 26 carried by the door 6. When the rod 23 is in its uppermost position, as shown in Fig. 7, the extension 25 will by reason of its engagement with the pin 26, hold the door 6 in its raised or closed position, the door 7 being held in a similar position by an arm 27 carried by the door 6 and engaging the under side of an arm 28 carried by the door 7. When the rod 23 is in its lower position, as shown in Fig. 17, the doors 6 and 7 are allowed to open by a downward swinging movement, in order that any coins which were deposited in the box 2 may pass therefrom into the receptacle or hopper 29. As clearly shown in Fig. 17, the end of arm 27 extends under the end of the arm 28 so that as the door 6 is moved to its closed position by the upward movement of the rod 23, the arm 27 will engage the arm 28 and thus close the door 7.

The operation of the parts thus far described is as follows: As the actuating member is reciprocated by the rotation of the gear wheel 9 it will rotate the ratchet wheel 18 and the cam 20. As long as either of the cam surfaces is in engagement with the pin 21, the rod 23 will be held in its raised position and the doors 6 and 7 will be kept closed. When, however, the cam surface is moved out of engagement with the pin 21, the rod 23 will fall by gravity to its lower position, thereby permitting the doors to open to discharge the coins from the box 2 into the hopper 29. By providing a double cam the doors will be opened and closed twice during each complete revolution of the ratchet wheel; and inasmuch as ratchet wheel 18 has four teeth, the opening of the doors 6, 7 will occur after every alternate upward movement of member 14.

The hopper 29 is provided with a normally closed slidingly mounted top gate or retaining closure 30 carrying a pin 31 adapted to be engaged by one or the other of a pair of lugs 32, 33 carried by an arm 34 which depends from the door 7. As the door opens the lug 32 will engage the pin 31 and slide the gate 30 to the right, as seen in Fig. 7, thereby permitting any coins which were above the gate to pass into the lower chamber 35, and in which they will be stacked one above another. As the door is moved to its closed position the lug 33 will engage the pin 31 and cause the gate 30 to return to its normal or closed position, where it serves to prevent the escape of coins, which might otherwise be caused by the movement of the ejector.

The chamber 35 is provided with a slot 36 adjacent its lower end through which the coins are forced, one at a time, into a runway 37 by means of an ejector 38. This ejector, which is mounted to slide in guideways 39, extends within a slot formed in the bottom of the receptacle 35 and is normally maintained in its forward position by means of a spring 40. The ejector is retracted by a pawl 41 carried upon one arm of a bell crank lever 42, the other arm of which is operatively connected to a member 43 secured to the reciprocatable actuating member 14, 15. As the lever 42 is rocked by the actuating member, the pawl 41 will engage a lug 44 on the ejector and move the latter against the tension of the spring 40 to occupy its rearward position. As soon as the pawl moves out of engagement with the lug the spring 40 will return the ejector to its normal position. At its forward end the ejector is provided with an upwardly extending lip 45 which is beveled on its inner surface so that as the ejector is forced rearwardly by the pawl 41 the beveled surface will permit the lip to slide under any coin or coins which may be in the receptacle. On the return of the ejector to its normal position the lip 45 will engage the coin, or the lowermost coin if there be more than one in the receptacle, and force it to pass through the slot 36 and into the runway 37.

Figures 4, 13, 14, 15:
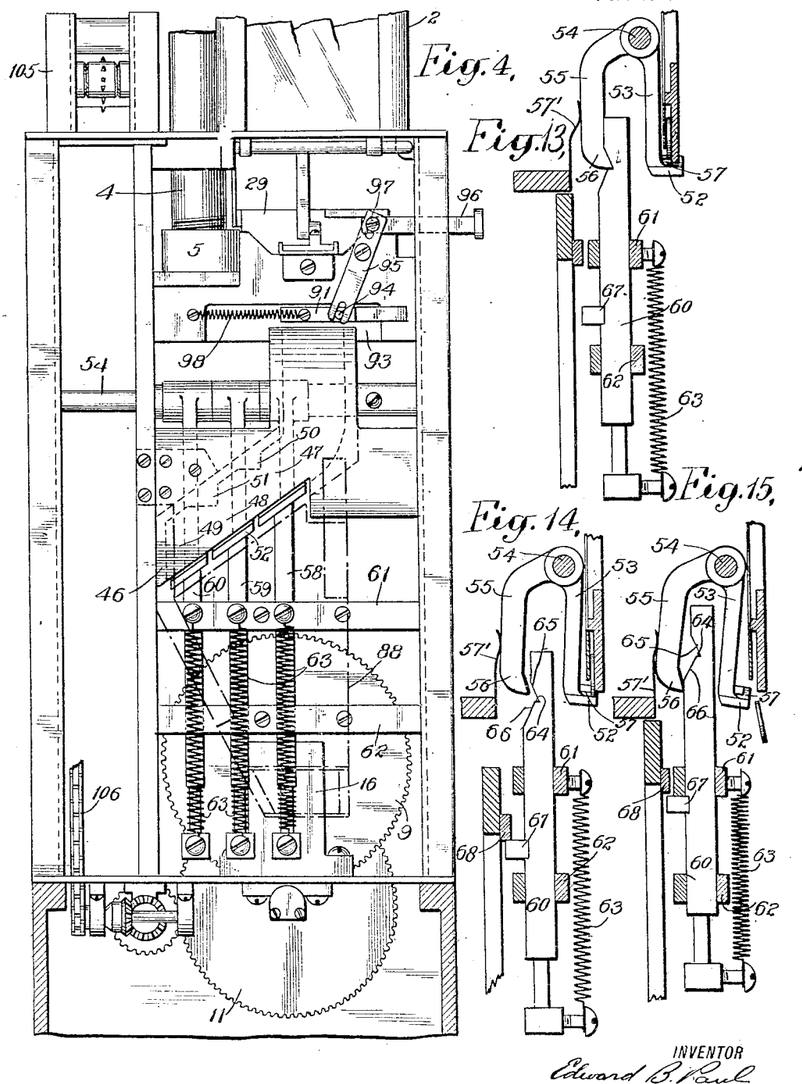
Fig. 4 is a rear elevational view, the wall of the casing being removed.
Figs. 13, 14 and 15 are detail views somewhat diagrammatic in character, illustrating the operation of the counting-device-actuating-means.
Figure 5:
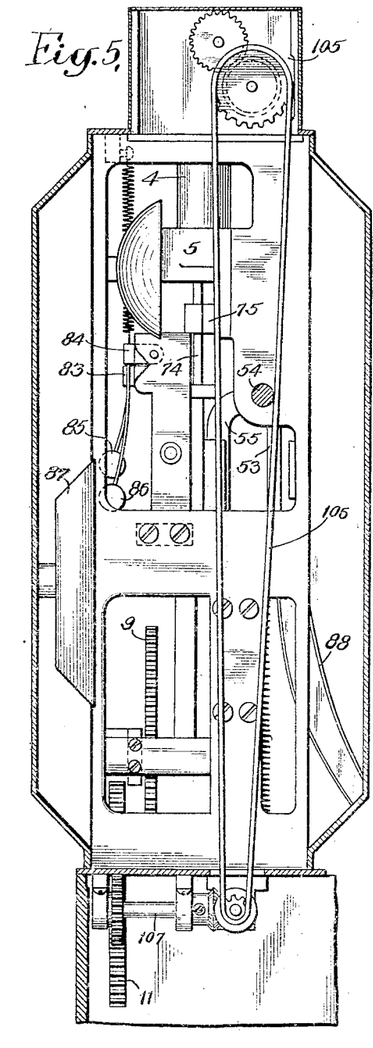
Fig. 5 is a sectional view taken on the line 5—5 of Fig. 3.

The runway 37 is curved downwardly, as shown in Figs. 4 and 7, and terminates in a transversely extended inclined portion 46 which is divided into a plurality of coin-receiving pockets 47, 48 and 49, by the coin-engaging projections 50 and 51 which extend into the upper part thereof. In the embodiment shown, the fare register is adapted to handle nickels, pennies and dimes, and the first projection 50 is adapted to engage nickels, retaining them in the pocket 47, and to allow pennies and dimes to pass on beyond this pocket. The second projection 51 engages the pennies, retaining them in the pocket 48, and allows the dimes to pass on into the third pocket 49 in which they are retained.

Each of the coin receiving pockets is provided with an opening in its bottom through which the coin may pass from the pocket as hereinafter described. The opening of each pocket is normally closed by means of a gate 52, it being understood that there is a separate gate for each pocket and that the construction of the several gates and their associated parts is similar. In each instance the gate 52 is supported at the lower end of one arm 53 of a bell crank lever mounted to rock upon a shaft 54. The other arm 55 of the lever is provided adjacent its end with a tooth 56 which coacts with the counting device actuating means as hereinafter described. Each gate is provided with an upwardly extending step 57, which is spaced from the outer edge of the gate and which, in the normal position of the gate, engages the inner surface of the outer wall of the runway 37. Springs 57' constantly urge the bell crank levers 53, 55 to occupy their normal positions.

Figure 16:
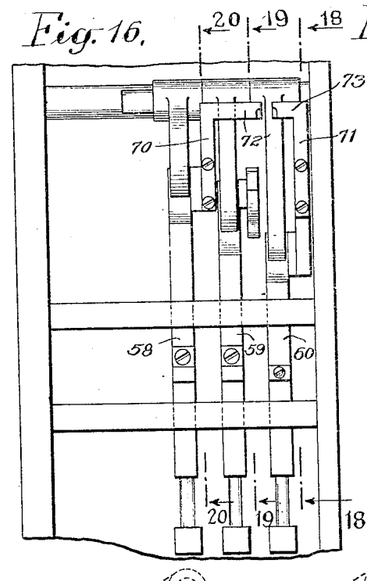
Fig. 16 is a detail view in elevation of the counting-device-actuating means.
Figure 18:
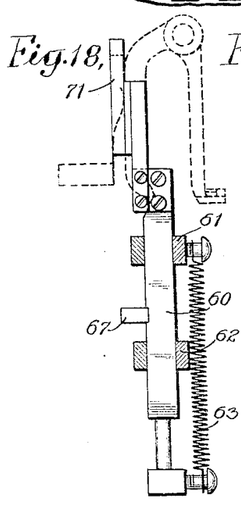
Figs. 18, 19 and 20 are detail sectional views taken on the lines 18—18, 19—19 and 20—20 respectively of Fig. 16, parts being shown in dotted lines for the sake of clearness.
Figures 19, 20:
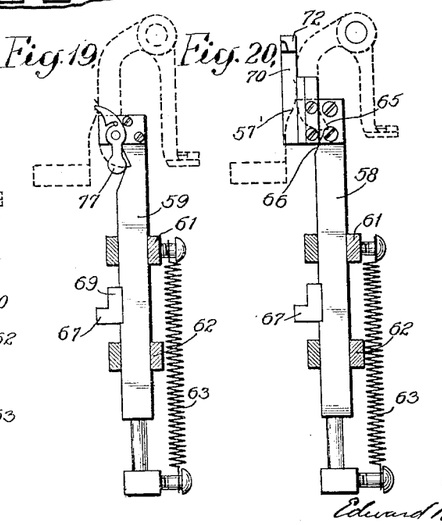

Coöperating with the bell crank levers 53, 55 are vertical bars 58, 59 and 60, which are slidingly mounted in horizontal supports 61 and 62 and which are constantly urged upward by springs 63. Each bar is provided with a notch 64 with which the tooth 56 on the arm 55 of its associated bell crank lever normally engages to stop the bar in its upward movement in inoperative position. Each bar is further provided with inclined surfaces 65 and 66 extending upwardly and downwardly from the notch 64, the length of the inclined surface 65 being less than the length of the inclined surface 66. Each of the bars carries a laterally extending projection 67 which lies in the path of a member 68 carried by the reciprocatable actuating member 14, 15, as clearly shown in Fig. 6, and the projections on the several bars are normally in horizontal alinement. Extending upwardly from each of the projections 67 (Figs. 18, 19 and 20) which are carried by the bars 58 and 59, which bars are associated with the nickel and penny receiving pockets, is a stop 69 (Fig. 19) which is adapted to engage the support 61 to limit the upward movement of these bars when the tooth 56 is held out of operative engagement with the notch 64 as hereinafter described. The projection 67 on the bar 60, which is associated with the dime pocket, is not provided with a stop 69, and therefore this bar may move upward until the projection 67 engages the support 61, from which it will be clear that the dime bar 60 can move upwardly a greater distance than either the nickel bar 58 or the penny bar 59. Secured to the upper ends of the nickel bar 58 and the dime bar 60, and extending upwardly therefrom are arms 70 and 71 (Fig. 16) provided at their upper ends with oppositely disposed laterally extending portions 72 and 73 upon which rests the lower end of a member 74 (Figs. 3 and 6) slidingly mounted in a bracket 75. Upon the upper end of the member 74 rests a plunger 76 which is mounted in the tubular support 4 and which has its upper end operatively connected to the counting device 3. The penny bar 59 is provided at its upper end with a pawl 77 adapted to engage the teeth of a ratchet wheel 78 (Fig. 6) which carries a diametrically disposed bar 79, the ends of which extend beyond the teeth of the ratchet wheel and are adapted to engage a downwardly extending projection 80 carried by the sliding member 74. The ratchet wheel 78 is provided with ten teeth, from which it will be understood that the ends of the bar 79 will be brought into operative relation with the projection 80 twice during a complete revolution of the ratchet wheel, or at every fifth movement thereof by the pawl 77.

The sliding member 74 carries a pair of laterally spaced dogs 81 and 82 (Fig. 3) adapted to engage successively the vertically and laterally spaced rocking members 83 and 84 (Fig. 6) which carry hammers 85 and 86 adapted, when actuated, to ring a bell 87.

The operation of the counting-device-actuating means is as follows: Assuming the various parts to be in their normal positions, as the reciprocatable actuating member 14, 15, moves downward, the member 68 will engage the projections 67 on the several bars 58, 59 and 60 and move them downward against the tension of the springs 63. During the downward movement of each bar the tooth 56 on the arm 55 of the bell crank lever associated therewith will ride upon the inclined surface 65 thus causing a rocking movement of the bell crank lever about the shaft 54. Due to this rocking movement the arm 53 of the bell crank lever will move rearwardly a distance sufficient to carry the step 57 out of engagement with the wall of the runway but this movement of the arm 53 will not be sufficient to cause the gate 52 to move out of registry with its pocket whereby the pocket will remain closed. Assuming that no coins are in the pockets, as the actuating member moves upward, the bars will be drawn upward by the springs 63 until the teeth 56 again engage their coacting notches 64, thereby preventing further upward movement of the bars which will be thus retained in their normally inoperative positions.

If a coin is present in one of the pockets, the operation is as follows, reference being had particularly to Figs. 13, 14 and 15. For purposes of illustration the parts associated with the dime pocket are shown, but it will, of course, be understood that the parts associated with the other coin receiving pockets operate in a similar manner. Assuming that a dime has been forced from the chamber 35 into the runway 37, it will travel along the vertical inclined portion 46 thereof until it lodges in dime receiving pocket 49 and will rest upon the step 57 as shown in Fig. 13. As the bar 60 is moved downward, as above described, causing the arm 53 of the bell crank lever to move backwardly, the step 57 will be moved from under the dime which will then take a position resting on the gate 52 between the step 57 and the outer wall of the runway 37, as shown in Fig. 14. As the bar 60 moves upward the tooth 56 is held out of the path of the notch 64 by reason of the fact that the interposition of the dime between the step 57 and the front wall of the runway prevents the bell crank lever from being returned to its normal position by the spring 57'. The bar 60 will, therefore, be drawn upward by the spring 63 beyond its normal position until the projection 67 engages the support 61, and during this further upward movement of the bar, the inclined surface 66 will engage the tooth 56 and rock the bell crank sufficiently to move the gate 52 out of registry with the pocket 49 and thus permit the dime to escape therefrom. During this further upward movement of the bar 60 the laterally extending portion 73 of the arm 71 which is secured to the upper end of the bar, will cause the sliding member 74 to move upward and this upward movement of the member, in turn, will cause the plunger 76 to rise a sufficient distance to register two fares on the counting device. During the upward movement of the member 74 the hammers 85 and 86 will be actuated successively to ring the bell 87 twice. The parts will be restored to their normal position upon the following reciprocating movement of the acuating member 14, 15.

The operation with respect to the nickel bar 58 is the same as above described with the exception that by reason of the stop 69 the bar is allowed to move upward beyond its normal position a distance sufficient to cause the plunger 76 to register but one fare on the counting device, and the hammer 86 will not be actuated, so that the bell will be rung only by the hammer 85.

In the operation of the penny bar 59, each of the pennies, of a group of five, will permit the pawl 77 to rotate the ratchet wheel 78 one step, and as it completes its fifth step, the end of the bar 79 will, by its engagement with the projection 80, cause the counting device to register one fare in a manner similar to that described with respect to the nickel bar.

As the coins pass out of their respective pockets they are received in a chute 88 which conducts them to suitable receptacle 89.

Figure 11:
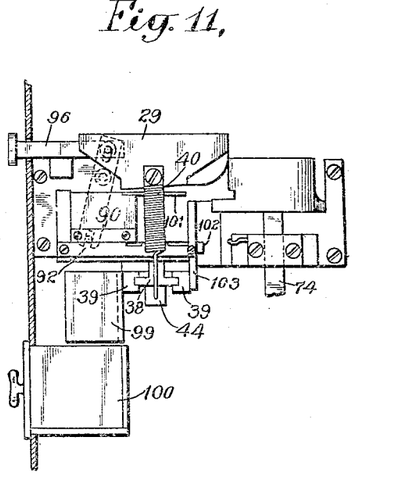
Fig. 11 is a detail view.

In order to provide for the removal of coins from the chamber 35, should such removal be desirable for any reason, the body portion thereof is mounted for lateral movement. Secured to the sides of the chamber are guides 90 and 91 resting on guideways 92 and 93 (Fig. 7). The guide 91 carries a pin 94 (Fig. 4) engaged by the slotted end of a pivotally mounted lever 95, the other end of which is secured to the shank of a push button 96 by a pin and slot connection 97. A spring 98 holds the chamber in its normal position. By pressing upon the push button 96, the chamber will be moved laterally, as shown in Fig. 11, and the coins will pass therefrom through the channel 99 and into the drawer 100. A plate 101, secured to the chamber, extends beneath the hopper 29 when the receiver is in its moved position, so that, if the gate 30 should be opened, any coins which might be within the hopper can not pass out of it until the receiver is returned to its normal position. In order to insure that the inner wall of the receiver will not strike against the lip 45 of the ejector 38, the receiver carries a lifting bar 102 which extends through a slot in the plate 103 and which is provided with a beveled lug 104 adapted to engage the lower end of the slot to tilt the receiver sufficiently to permit its inner wall to pass over the lip 45.

If desired, a ticket counter 105 of any suitable type may be provided, the operation of which is controlled by an endless belt or chain 106 driven from the gear wheel 11 by suitable gearing 107.

What I claim is:

1. In a fare register adapted for receiving coins of various denominations, the combination of an assorting mechanism for the coins by which they are positioned according to their denominations, a counter, counter-actuating devices corresponding to the several denominational groups of coins and adapted to actuate the counter in accordance with the different denominations of the coins to count them in terms of a single denomination, locking means normally holding said devices from operation, coin-controlled means to render said locking means inoperative whereby said devices may actuate the counter, and means for discharging the coins from the assorting mechanism after they have performed their controlling function upon the counter actuating devices, said discharging means being actuated by the counter-actuating devices as these devices operate as the result of the performance of such controlling function thereon; substantially as described.

2. In a fare register, in combination, a coin-receiving pocket having a removable wall, a counting-device, a movable member to actuate the counting device, means operatively connected to said movable wall and normally in the path of the movable member to prevent operative movement thereof, and means controlled by a coin in the pocket to hold said means out of the path of the movable member to permit it to actuate the counting-device; substantially as described.

3. In a fare register, in combination, a coin receiving pocket having a coin discharge opening, a gate normally closing said opening and having a stepped portion normally extending within the pocket, a swinging member carrying said gate, means to swing said member to withdraw the stepped portion of the gate from the pocket whereby a coin within the pocket will position itself between said stepped portion and the wall of the pocket to hold the member in its swung position, and means to cause a further swinging movement of said member to carry the gate out of registry with the pocket whereby the coin will be permitted to pass therefrom; substantially as described.

4. In a fare register, in combination, a coin receiving pocket having a coin discharge opening, a movable gate normally closing said opening, a reciprocatable member adapted upon movement in one direction to cause an initial movement of the gate, such movement being insufficient to uncover the opening, said gate returning to its normal position upon movement of the reciprocatable member in the opposite direction if no coin is in the pocket, and coin-engaging means to prevent the return movement of the gate if a coin is present in the pocket, said reciprocatable member being adapted upon movement in said opposite direction to cause the gate to move out of registry with the opening when a coin is in the pocket whereby the coin may pass therefrom, substantially as described.

5. In a fare register, in combination, a coin receiving pocket provided with a coin discharge opening, a gate normally closing said opening, a counting device and means operating to open said gate sufficiently to permit a coin to partially pass through the discharge opening and thereby lock the gate partiallly open and then operating to actuate said counting device; substantially as described.

6. In a fare register, in combination, an inclined runway adapted to receive the coins, means forming pockets therein to selectively retain coins according to their denomination, gates normally closing said pockets, and means to partially open said gates to permit a single coin in any pocket to become disposed to partially protrude from the pocket; substantially as described.

7. In a fare register, in combination, a counting device, actuating means therefor comprising independently movable bars, means tending to move each of said bars to operate the counting device, means for operating each of said bars against such tendency and for thereupon releasing each of said bars to permit the same to respond to such tendency, detent means normally restraining the extent of movement of each of said bars in response to such tendency, coin controlled means to render the detent means in operative and thereby permit the bars to actuate the counting device, and means limiting the counter-actuating movements of the bars, said limiting means permitting a greater movement of one of said bars than of the other; substantially as described.

8. In a fare register adapted to handle coins of various denominations, in combination, a ratchet wheel, coin controlled means to impart a step by step rotation thereto, said means being controlled by a coin of a certain denomination only, a counting device, means to operate said counting device, and means operatively associated with said ratchet wheel to actuate said operating means upon said ratchet wheel being rotated a predetermined number of steps; substantially as described.

9. In a fare register, in combination, a coin receiver consisting of a bottom portion and a body portion and being provided with a discharge opening, a reciprocatable ejector having a coin engaging lip to engage the coins in the receiver and force them through the opening, means for reciprocating the ejector, means to move the body portion of the receiver out of registry with the bottom portion thereof, and means to tilt the body portion of the receiver to permit it to pass over the lip of the ejector; substantially as described.

10. Mechanism for operating the counter of a fare register comprising a reciprocating motor member, a counter-actuating bar arranged to be moved in one direction by each reciprocation of the motor-member, a coin pocket, a stop for the bar which is moved to release position by the bar as it is moved by the motor member, and which is held in release position by a coin in the pocket, means for moving the bar in the opposite direction, and means on the bar for actuating the stop when the bar is so moved to discharge the coin from the pocket; substantially as described.

11. In mechanism for operating the counter of a fare register, a coin pocket, a reciprocated counter-actuating bar, a locking stop for the bar, mechanism for periodically moving the stop to release position, a connection between the stop and pocket whereby a coin in the pocket will hold the stop in such position, and means for returning the stop to the locking position if there is no coin in the pocket; substantially as described.

12. In mechanism for operating the counter of a fare register, a coin pocket, a reciprocated counter-actuating bar, a locking stop for the bar, mechanism for periodically moving the stop to release position, a connection between the stop and pocket whereby a coin in the pocket will hold the stop in such position, means for returning the stop to the locking position if there is no coin in the pocket, and means for engaging the stop when it is held in the release position to move it and the said connection to discharge the coin from the pocket; substantially as described.

13. In a fare register, a coin-assorting mechanism having a plurality of pockets for retaining coins of different denominations, means for feeding coins to said mechanism, a counter, counter-actuating bars associated with the several coin pockets, a locking stop for each bar, mechanism for periodically moving the several stops to release position, individual connections between the stops and the respective pockets whereby a coin in any pocket will hold the corresponding stop in the release position, means for returning each stop to the locking position if there is no coin in the corresponding pocket, and means for causing the released bars to actuate the counter; substantially as described.

14. In a fare register, a coin-assorting mechanism having plurality of pockets for retaining coins of different denominations, means for feeding coins to said mechanism, a counter, counter-actuating bars associated with the several coin pockets, a locking stop for each bar, mechanism for periodically moving the several stops to release position, individual connections between the stops and the respective pockets whereby a coin in any pocket will hold the corresponding stop in the release position, means for returning each stop to the locking position if there is no coin in the corresponding pocket, and means for causing the released bars to actuate the counter, said means including differential devices associated with the several counter-actuating bars to effect different registration according to the denominations of the coins, whereby the coins are registered in terms of a single denomination; substantially as described.

In testimony whereof I affix my signature.

EDWARD B. PAUL.

Copies of this patent may be obtained for five cents each, by addressing the "Commissioner of Patents, Washington, D. C."

It is hereby certified that in Letters Patent No. 1,286,758, granted December 3, 1918, upon the application of Edward B. Paul, of Winthrop, Massachusetts, for an improvement in "Fare-Registers," an error appears in the printed specification requiring correction as follows: Page 5, line 28, claim 2, for the word "removable" read *movable;* and that the said Letters Patent should be read with this correction therein that the same may conform to the record of the case in the Patent Office.

Signed and sealed this 14th day of January, A. D., 1919.

[SEAL.]

Cl. 235—32.

F. W. H. CLAY,

*Acting Commissioner of Patents.*